(12) United States Patent
Burstall et al.

(10) Patent No.: US 12,313,452 B2
(45) Date of Patent: May 27, 2025

(54) BEAM DETECTORS (71) Applicant: FFE Limited, Hitchin (GB)

(72) Inventors: Oliver Burstall, Hitchin (GB); Steve Revill, Hitchin (GB)

(73) Assignee: FFE Limited (GB)

( * ) Notice: Subject to any disclaimer, the term of this patent is extended or adjusted under 35 U.S.C. 154(b) by 463 days.

(21) Appl. No.: 17/767,185

(22) PCT Filed: Oct. 8, 2020

(86) PCT No.: PCT/GB2020/052480
§ 371 (c)(1),
(2) Date: Apr. 7, 2022

(87) PCT Pub. No.: WO2021/069892
PCT Pub. Date: Apr. 15, 2021

(65) Prior Publication Data
US 2022/0364912 A1 Nov. 17, 2022

(30) Foreign Application Priority Data
Oct. 8, 2019 (GB) ...................................... 1914527

(51) Int. Cl.
*G01N 21/53* (2006.01)
*G01J 1/04* (2006.01)
*G08B 13/184* (2006.01)
(52) U.S. Cl.
CPC ............ *G01J 1/0429* (2013.01); *G01N 21/53* (2013.01); *G08B 13/184* (2013.01)
(58) Field of Classification Search
CPC ..... G01J 1/0429; G01N 21/53; G08B 13/184; G08B 17/103
See application file for complete search history.

(56) References Cited

U.S. PATENT DOCUMENTS 5,113,403 A * 5/1992 Block .................. H04B 10/803
372/38.1
5,502,434 A 3/1996 Minowa et al.
(Continued)

FOREIGN PATENT DOCUMENTS

DE 19801632 A1 5/1999
EP 1265205 A1 12/2002

OTHER PUBLICATIONS

International Search Report and Written Opinion for International Application PCT/GB2020/052480, dated Mar. 16, 2021, 19 pages.

*Primary Examiner* — Nay Tun
(74) *Attorney, Agent, or Firm* — Buchanan Ingersoll & Rooney PC (57) ABSTRACT

A beam detector apparatus (1) comprising: beam emitter apparatus (2); reflector apparatus (3), locatable across a volume to be monitored; and beam receiver apparatus (4). The beam emitter apparatus (2) is capable of creating a first linearly polarised beam of light of first linear polarisation and directing said first linearly polarised beam of light towards the reflector apparatus. The reflector apparatus (3) is capable of either: receiving the first linearly polarised beam of light and modifying such light into a beam having circular polarisation, elliptical polarisation or being unpolarised, and reflecting said circularly polarised, elliptically polarised or unpolarised beam of light towards the beam receiver apparatus; OR receiving the first linearly polarised beam of light and reflecting such light towards the beam receiver, and modifying such light into a beam having circular polarisation, elliptical polarisation or being unpolarised. The beam receiver apparatus (4) is capable of receiving said circularly polarised, elliptically polarised or unpolarised light and creating therefrom a second linearly polarised beam of light, (Continued)

in which the first and second linearly polarised beams of light have different polarisation.

19 Claims, 2 Drawing Sheets

(56) References Cited

U.S. PATENT DOCUMENTS

| | | | | |
|---|---|---|---|---|
| 2002/0088922 A1* | 7/2002 | Schmitz | ............... | G11B 7/22 |
| | | | | 250/206.1 |
| 2002/0163691 A1* | 11/2002 | Wong | ............. | H04Q 11/0003 |
| | | | | 385/24 |
| 2004/0027939 A1* | 2/2004 | Okada | ............... | G01J 3/1804 |
| | | | | 369/44.37 |
| 2004/0165589 A1* | 8/2004 | Tomich | ........... | H04Q 11/0067 |
| | | | | 370/389 |
| 2022/0364912 A1* | 11/2022 | Burstall | ........... | G08B 17/103 |

* cited by examiner

BEAM DETECTORS

CROSS REFERENCE TO RELATED APPLICATIONS

This application is the U.S. National Stage filing of International Appln. No. PCT/GB2020/052480, filed Oct. 8, 2020, which claims priority to GB Application No. 1914527.5, filed Oct. 8, 2019, the contents of each of which are incorporated herein by reference in their entirety for all purposes.

FIELD OF THE INVENTION

The present invention relates to a beam detector apparatus, a method for beam detection, a method for commissioning a beam detector apparatus, use of a retro-fit kit for a beam detector apparatus, and an optical beam smoke detector apparatus and associated method.

SUMMARY AND BACKGROUND OF THE INVENTION

In summary, a reflective optical beam smoke detector system typically includes a detector unit, which includes both an emitter and a receiver, and a retroreflector. The detector unit and the reflector are placed opposite each other at opposed ends of a volume to be protected and monitored. The transmitter projects a beam, in this example an Infrared (IR) beam, on to the retroreflector which reflects the IR beam along the same axis back to the receiver. Smoke in the beam path will reduce the amount of projected light returning to the receiver. The receiver continuously monitors the amount of light received and, if it drops below a certain user-defined threshold—an obscuration threshold—then an alarm or warning is initiated. Alignment of the projected beam on to the reflector can be fully automated, and a motorised detector typically aligns itself on to the highest signal level it can detect. Of course, optical beam smoke detector systems can operate using Ultraviolet too. Further, if the amount of light received drops below a certain user-defined threshold, remedial fire prevention may be started in addition to or instead of initiating an alarm.

Those skilled in the art will know that an optical beam smoke detector uses a projected beam of light—not a laser beam—to detect obscuration in the beam path caused by smoke, and such detectors are typically used to detect smoke across large volumes to be monitored.

A problem experienced by reflective-type beam detectors is when such detectors encounter reflections from other objects, for example, metallic or gloss surfaces within the volume to be monitored. Such other objects may return equivalent or even higher signal levels than the reflector, and this is particularly true if the reflection is from an object that is physically closer to the emitter and receiver than the reflector, but also true even with surfaces that are not so highly reflective, when the space through which the beam is directed is relatively narrow. Accordingly, these detectors can be problematic to install and/or prone to false alarms if the monitored signal level has been affected by a source of light other than the beam of light reflected by the reflector.

The present invention is, therefore, aimed at providing an improved beam detector, which is easier to install and/or is less susceptible to false alarms from reflections from sources other than the reflector.

According to a first aspect, the present invention relates to a beam detector apparatus comprising:

beam emitter apparatus;
reflector apparatus, locatable across a volume to be monitored; and
beam receiver apparatus,
wherein:
the beam emitter apparatus is capable of creating a first linearly polarised beam of light of first linear polarisation and directing said first linearly polarised beam of light towards the reflector apparatus;
the reflector apparatus is capable of either:
receiving the first linearly polarised beam of light and modifying such light into a beam having circular polarisation, elliptical polarisation or being unpolarised, and reflecting said circularly polarised, elliptically polarised or unpolarised beam of light towards the beam receiver apparatus;
OR
receiving the first linearly polarised beam of light and reflecting such light towards the beam receiver, and modifying such light into a beam having circular polarisation, elliptical polarisation or being unpolarised; and
the beam receiver apparatus is capable of receiving said circularly polarised,
elliptically polarised or unpolarised light and creating therefrom a second linearly polarised beam of light, in which the first and second linearly polarised beams of light have different polarisation.

Preferably, the first and second linearly polarised beams of light have orthogonal polarisation.

Preferably, reflected light is of determinably different polarisation to the incoming light, and is of substantially the same polarisation as any polariser of the receiver apparatus.

Preferably, the beam emitter apparatus comprises:
a linearly polarising emitter for creating the first linearly polarised beam of light;
an emitter and one or more polarising filters for creating the first linearly polarised beam of light;
an integrated emitter and one or more polarising filters for creating the first linearly polarised beam of light; or
an emitter and a retro-fit, linear polarising filter for creating the first linearly polarised beam of light.

Further preferably, the linearly polarising emitter is a light emitting diode (LED).

Preferably, the reflector apparatus comprises:
a circular or elliptical polarising filter, with or without an additional mirror or prism;
a retroreflector;
a spherical retroreflector;
a corner-cube retroreflector;
a pair of orthogonally disposed mirrors and associated polarising filters, capable of firstly circular polarisation and then linear polarisation of the emitted light; or
a mirror or prism, and a quarter-wave plate, with or without an additional polarising filter of same polarisation as the first linearly polarised beam of light.

Accordingly, if a specific form of reflector also imparts elliptical or circular polarisation, or makes the beam unpolarised, during reflection, no additional polarising filter is required.

Preferably, the beam receiver apparatus comprises:
a linearly polarising receiver;
a receiver and one or more polarising filters for creating or transmitting the second linearly polarised beam of light;

an integrated receiver and one or more polarising filters for creating or transmitting the second linearly polarised beam of light; or a receiver and a retro-fit, linear polarising filter for creating or transmitting the second linearly polarised beam of light.

Preferably, the polarising filter of the reflector apparatus corresponds to the polarising filter of the receiver apparatus, such that light of a particular polarisation created at the reflector apparatus is transmitted through a further filter of same polarisation at the receiver apparatus, and is, thereby, detectable. Preferably, the polarising filter of the reflector apparatus corresponds to the polarising filter of the receiver apparatus.

Preferably, the polarising filter of the reflector apparatus corresponds to the polarising filter of the receiver apparatus. Further preferably, polarising filters of the reflector apparatus and the receiver apparatus have the same polarisation.

Preferably, the beam detector apparatus is a reflective-type smoke detector and is, most preferably, an optical beam smoke detector. Preferably, the beam emitter apparatus is an optical beam emitter apparatus; preferably, the beam receiver apparatus is an optical beam receiver apparatus.

The present invention may also relate to an optical beam smoke detector apparatus, substantially as herein disclosed, with reference to FIGS. 1a and 1b or FIGS. 2a and 2b of the accompanying drawings and/or any example described herein.

According to a second aspect, the present invention provides a method for detecting obscuration comprising:
projecting a first linearly polarised beam of light of first linear polarisation across a volume to be monitored;
receiving the first linearly polarised beam of light across said volume to be monitored and either:
modifying the first linearly polarised beam of light into a circularly polarised, elliptically polarised or unpolarised beam of light and then reflecting the circularly polarised, elliptically polarised or unpolarised beam of light across the volume to be monitored or a further volume to be monitored;
OR
reflecting and then modifying the first linearly polarised beam of light into a circularly polarised, elliptically polarised or unpolarised beam of light before its traversing the volume to be monitored or a further volume to be monitored;
receiving the circularly polarised, elliptically polarised or unpolarised beam of light across the volume to be monitored or a further volume to be monitored, and modifying the received circularly polarised, elliptically polarised or unpolarised beam of light into a second linearly polarised beam of light, wherein the first and second linearly polarised beams of light have different polarisation; and
detecting obscuration if an intensity of the second linearly polarised beam of light is below a threshold.

Preferably, projecting additionally comprises creating:
a beam of unpolarised light and modifying it into a first linearly polarised beam of light; or
using a linearly polarising emitter to create the first linearly polarised beam of light.

Preferably, modifying the unpolarised beam of light comprises:
passing the beam of light through a first linear polarising filter, of first polarisation; or
using a linearly polarising emitter to create the first linearly polarised beam of light.

Preferably, reflecting and then modifying, or modifying and then reflecting the first linearly polarised beam of light comprises:
passing the beam through a circular or elliptical polarising filter and reflecting using a mirror or prism;
reflecting using a mirror or prism, and passing the beam through a circular or elliptical polarising filter;
reflecting the beam using a retroreflector;
reflecting the beam using a corner-cube retroreflector;
passing the beam through a quarter-wave plate, with or without additional polarising filter of same polarisation as first linearly polarised beam of light, and reflecting using a mirror or prism;
passing the beam through a pair of orthogonally disposed mirrors and associated polarising filters, which first circularly polarise and then linearly polarise the emitted light; or
reflecting the beam using a mirror or prism, and passing the beam through a quarter-wave plate, with or without additional polarising filter of same polarisation as first linearly polarised beam of light.

Preferably, reflecting and then modifying, or modifying and then reflecting the first linearly polarised beam of light comprises using means for detecting, and optionally recognising, an incoming signal and emitting a return signal having circular polarisation or elliptical polarisation, or which is unpolarised.

Preferably, modifying the received circularly polarised, elliptically polarised or unpolarised beam of light comprises:
passing the beam through a second linear polarising filter, of different polarisation to the first linear polarisation; or
detecting the circularly polarised, elliptically polarised or unpolarised beam of light using a linearly polarising receiver.

Preferably, the method for detecting obscuration is a method for detecting smoke. Most preferably, the method uses an optical beam for smoke detection.

The present invention may also relate to a method for detecting smoke substantially as herein disclosed, with reference to the accompanying description and/or any example described herein.

According to a third aspect, the present invention provides a method for commissioning a detector apparatus, the method comprising:
projecting a first linearly polarised beam of light of first linear polarisation across a volume to be monitored;
receiving the first linearly polarised beam of light across said volume to be monitored and either:
modifying the first linearly polarised beam of light into a circularly polarised, elliptically polarised or unpolarised beam of light and then reflecting the circularly polarised, elliptically polarised or unpolarised beam of light across the volume to be monitored or a further volume to be monitored;
OR
reflecting and then modifying the first linearly polarised beam of light into a circularly polarised, elliptically polarised or unpolarised beam of light before its traversing the volume to be monitored or a further volume to be monitored;
receiving the circularly polarised, elliptically polarised or unpolarised beam of light across the volume to be monitored or a further volume to be monitored, and modifying the received circularly polarised, elliptically polarised or unpolarised beam of light into a second linearly polarised beam of light, in which the first and second linearly polarised beams of light have different polarisation; and detecting and comparing with a commissioning threshold the intensity of the second linearly polarised beam of light, and adjusting alignment of the projected beam with a reflector apparatus if the intensity is below the commissioning threshold.

Preferably, the method comprises any one or more features according to the second aspect.

According to a fourth aspect, the present invention provides use of a retro-fit kit for a beam detector apparatus, the detector apparatus being according to the first aspect and the kit comprising:

a first retro-fit, linear polarising filter for a beam emitter, capable of creating from an emitted beam a first linearly polarised beam of light of first linear polarisation;

a second retro-fit, linear polarising filter for a beam receiver, capable of creating from a received beam a second linearly polarised beam of light of second linear polarisation;

the first and second retro-fit, linear polarising filters have different polarisation, wherein the use comprising:

securing a first retro-fit, linear polarising filter to a beam emitter of the beam detector apparatus; and securing a second retro-fit, linear polarising filter to a beam receiver of the beam detector apparatus, the use further comprising:

projecting a first linearly polarised beam of light of first linear polarisation across a volume to be monitored;

receiving the first linearly polarised beam of light across said volume to be monitored and either:

modifying the first linearly polarised beam of light into a circularly polarised, elliptically polarised or unpolarised beam of light and then reflecting the circularly polarised, elliptically polarised or unpolarised beam of light across the volume to be monitored or a further volume to be monitored;

OR reflecting and then modifying the first linearly polarised beam of light into a circularly polarised, elliptically polarised or unpolarised beam of light before its traversing the volume to be monitored or a further volume to be monitored;

receiving the circularly polarised, elliptically polarised or unpolarised beam of light across the volume to be monitored or a further volume to be monitored, and modifying the received circularly polarised, elliptically polarised or unpolarised beam of light into a second linearly polarised beam of light, in which the first and second linearly polarised beams of light have different polarisation; and, either:

detecting and comparing with a commissioning threshold the intensity of the second linearly polarised beam of light, and adjusting alignment of the projected beam with the reflector apparatus if the intensity is below the commissioning threshold; or detecting obscuration if an intensity of the second linearly polarised beam of light is below an obscuration threshold.

Preferably, the first and second polarisations are orthogonal.

Preferably, the kit is adapted to locate the first retro-fit, linear polarising filter in front of an emitter.

Preferably, the kit is adapted to locate the second retro-fit, linear polarising filter in front of a receiver.

Further preferably, the kit is a sleeve, cap or cover comprising means for securing the sleeve, cap or cover over a front of a housing of the emitter/receiver.

Preferably, the kit is adapted for temporary or permanent installation to said beam detector apparatus and, preferably is adapted for temporary or permanent installation to an optical beam smoke detector apparatus. The temporary installation kit is used during commissioning of the apparatus, whereas, the permanent installation kit is used during commissioning and/or normal use of the apparatus.

The obscuration threshold may be set at a different level to the commissioning threshold, and the thresholds may be implemented differently with respect to time. For instance, the obscuration threshold may need to be met for a defined time-period before an alarm or warning is initiated.

According to a fifth aspect, the present invention provides an optical beam smoke detector apparatus comprising:

optical beam emitter apparatus;

reflector apparatus, locatable across a volume in which smoke is to be monitored; and optical beam receiver apparatus, wherein:

the optical beam emitter apparatus is capable of creating a first polarised optical beam of light, of first polarisation, and directing said first polarised optical beam of light towards the reflector apparatus;

the reflector apparatus is capable of:

receiving said first polarised optical beam of light and modifying and reflecting, or reflecting and modifying said first polarised optical beam of light into a second polarised optical beam of light, comprising at least a portion of light having a second polarisation different to the first polarisation; and directing said second polarised optical beam of light towards the optical beam receiver apparatus; and the optical beam receiver apparatus is capable of receiving the second polarised optical beam of light and detecting light having said second polarisation.

Preferably, the first and second polarisations are different linear polarisations, preferably orthogonal polarisations.

According to a sixth aspect of the present invention, there is provided a method for detecting obscuration of an optical beam in an optical beam smoke detector comprising:

projecting a first polarised optical beam of light, of first polarisation, across a volume in which smoke is to be monitored;

receiving the first polarised optical beam of light across said volume to be monitored and modifying and reflecting, or reflecting and modifying, said first polarised optical beam of light into a second polarised optical beam of light, comprising at least a portion of light having a second polarisation different to the first polarisation;

receiving the second polarised optical beam of light across the volume in which smoke is to be monitored or a further volume in which smoke is to be monitored, and detecting obscuration if an intensity of light of second polarisation is below a threshold.

Preferably, the first and second polarisations are different linear polarisations, preferably orthogonal polarisations.

The present invention may relate to a beam detector apparatus comprising: beam emitter apparatus; reflector apparatus, locatable across a volume to be monitored; and beam receiver apparatus, wherein: the beam emitter apparatus is capable of creating a first polarised beam of light, of first polarisation, and directing said first polarised beam of light towards the reflector apparatus; the reflector apparatus is capable of: receiving said first polarised beam of light and modifying and reflecting, or reflecting and modifying said first polarised beam of light into a second polarised beam of light, comprising at least a portion of light having a second polarisation different to the first polarisation; and directing said second polarised beam of light towards the beam receiver apparatus; and the beam receiver apparatus is capable of receiving the second polarised beam of light and detecting light having said second polarisation.

Preferably, the invention may include one or more features as defined in relation to the first aspect.

The present invention may also relate to a method for detecting obscuration comprising: projecting a first polarised beam of light, of first polarisation, across a volume to be monitored; receiving the first polarised beam of light across said volume to be monitored and modifying and reflecting, or reflecting and modifying, said first polarised beam of light into a second polarised beam of light, comprising at least a portion of light having a second polarisation different to the first polarisation; receiving the second polarised beam of light across the volume to be monitored or a further volume to be monitored, and detecting obscuration if an intensity of light of second polarisation is below a threshold.

Preferably, the invention may include one or more features as defined in relation to the second aspect.

The present invention may relate to a kit for a beam detector apparatus, the kit comprising:
  a first retro-fit, linear polarising filter for a beam emitter, capable of creating from an emitted beam a first linearly polarised beam of light of first linear polarisation;
  a second retro-fit, linear polarising filter for a beam receiver, capable of creating from a received beam a second linearly polarised beam of light of second linear polarisation;
wherein the first and second retro-fit, linear polarising filters have different polarisation.

The first and second retro-fit, linear polarising filters may have orthogonal polarisation.

The present invention may relate to a method for commissioning a detector apparatus, the method comprising: projecting a first polarised beam of light, of first polarisation, across a volume to be monitored; receiving the first polarised beam of light across said volume to be monitored and modifying and reflecting, or reflecting and modifying, said first polarised beam of light into a second polarised beam of light, comprising at least a portion of light having a second polarisation different to the first polarisation; receiving the second polarised beam of light across the volume to be monitored or a further volume to be monitored; and detecting and comparing with a threshold the intensity of light of second polarisation, and adjusting alignment of the projected beam with a reflector apparatus if the intensity is below a threshold.

Preferably, the invention may include one or more features as defined in relation to the third aspect.

Advantageously, the present invention provides a detector apparatus in which the receiver can readily distinguish between light received from the emitter and reflector, as compared to light from other sources. Further advantageously, light received from the reflector apparatus includes at least a portion of light having a different polarisation to the emitted light, such that the receiver apparatus can readily distinguish reflected light from light from other sources.

Advantageously, light which has been emitted, linearly polarised, then: circularly polarised; elliptically polarised; or unpolarised, and reflected by the reflector has the correct polarisation to be received by the receiver and analysed. Light that has been reflected from the reflector has circular polarisation, elliptical polarisation or is unpolarised and, therefore, includes light of both first and second linear polarisations. Accordingly, some of that light will pass through the receiver filter (which substantially only lets through light of second linear polarisation), and be used for (smoke) detection. However, any emitted light that is reflected from a surface other than the reflector, will either have the same polarisation as the light from the emitter, i.e. be of first linear polarisation, or have polarisation closely related to that of the light from the emitter. Accordingly, as that light does not have the correct polarisation for the receiver filter, it either cannot pass through the filter and is, therefore, not detected by the receiver, or the amount of such light is significantly reduced making up very little of a detectable signal.

Advantageously, the invention improves immunity to background light sources and improves immunity to reflections within the environment, thereby allowing the invention to be used in places which would otherwise be too challenging for prior art detectors.

Providing a polarising filter at the receiver allows one to discriminate between a desired reflection from the reflector from other light sources. It is, thereby, particularly advantageous in an optical beam smoke detector system to create at the receiver, rather than at the reflector, light of a second linear polarisation, being different to the first linear polarisation. In a reflective-type system, that can mean only having to provide linear polarisers on the emitter and receiver which, as part of the same housing or apparatus, makes it much easier and cost-effective. It will therefore be understood that both linear polarisers on the emitter and receiver can be made commensurate to the size of the emitter and receiver, both being relatively small when compared to the reflector. Further, owing to the spread of light in an optical beam when directed across a volume to be monitored, one must use a reflector of commensurate size to the cone of the optical beam received across the volume, which makes such reflectors typically much larger than if, say, a laser was to be reflected. Accordingly, converting the light in to a second linear polarisation at the reflector involves using a linear polariser at the reflector having a size commensurate to the size of the reflector (and the optical beam received) and, owing to the expense of such a polariser, makes such detectors cost-prohibitive.

The importance of the effect of a corner-cube, retroreflector providing an elliptically polarised reflection has been hitherto unrecognised. Accordingly, in the context of the present invention, this effect provides a surprising and significant improvement to a detector apparatus when used in conjunction with two different linear polarising filters at the emitter and receiver. Accordingly, such an effect is an unexpected technical effect and not a mere bonus effect.

Further advantageously, other light, i.e. not derived from the emitter, will also be polarised at the receiver filter, which can be used to help reduce the noise floor and accommodate the reduced signal level that may result from polarising the emitted light.

Advantageously, providing a kit of retro-fit items has the effect of upgrading an apparatus to which the items are installed, making the detector apparatus easier to commission and/or less susceptible to light reflected or received from sources other than the reflector.

Further advantageously, the time required for commissioning the apparatus to align the beam with the reflector is reduced.

As used herein, the terms 'light' and 'beam of light' are intended to encompass all light, and not just light in the visible part of the spectrum.

A beam detector, or beam smoke detector, may detect obscuration or scattering of a beam, which beam may be any form of light including a laser.

Optical beam smoke detectors detect obscuration of light and, typically (but not always), project an Infrared or Ultraviolet beam of light, so that the beam is invisible to the naked eye. So, in this context, the term 'optical beam' encompasses more than just visible light; however, the term is not intended to cover light specifically emitted by a laser.

BRIEF DESCRIPTION OF THE DRAWING FIGURES

The invention will now be disclosed, by way of example only, with reference to the following drawings, in which.

DETAILED DESCRIPTION OF THE INVENTION

Figure 1A:
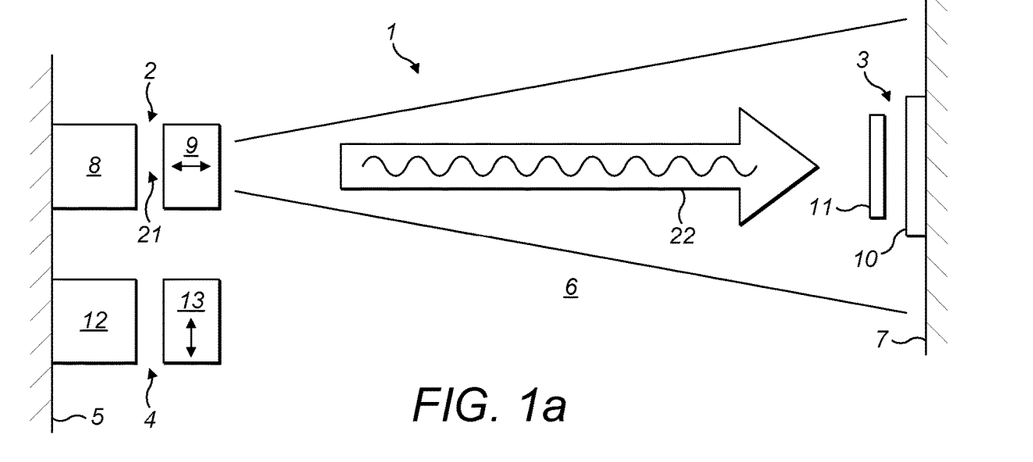
FIGS. 1a and 1b are schematic views of a first embodiment of optical beam smoke detector apparatus.
Figure 1B:
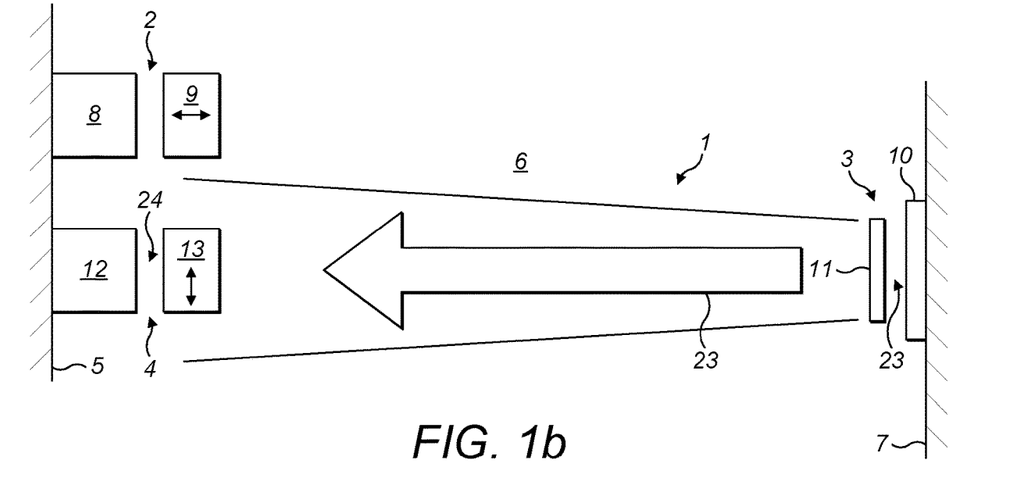

FIGS. 1a and 1b show an optical beam smoke detector apparatus, generally identified by reference 1. The apparatus 1 includes an optical beam emitter apparatus 2, a reflector apparatus 3, and an optical beam receiver apparatus 4. Both the emitter apparatus 2 and receiver apparatus 4 are located on a surface 5, at one edge of a volume 6 to be monitored. The reflector apparatus 3 is located on an opposed surface 7, at a further edge of the volume 6 to be monitored. Accordingly, this arrangement of the detector apparatus 1 provides a reflective-type smoke detector apparatus.

The emitter apparatus 2 includes an emitter 8 and an emitter filter 9. The emitter 8 is capable of producing a beam of unpolarised light. The emitter filter 9 is a linear polarising filter, which can polarise light it receives from the emitter into a first linearly polarised beam of light prior to its being projected across the volume 6 to be monitored. As shown in FIGS. 1a and 1b, filter 9 polarises light in a first plane of linearly polarised light, being identified as (–).

The reflector apparatus 3 includes a reflector 10 and a reflector filter 11. The reflector 10 is capable of reflecting light received from the emitter 8 and directing it back towards the receiver apparatus 4. The reflector filter 11 is a circular polarising filter, which is capable of receiving the first linearly polarised beam of light from the emitter apparatus 2 and converting it into a circularly polarised beam of light.

The receiver apparatus 4 includes a receiver 12, capable of receiving the light from across the volume 6 to be monitored, and a receiver filter 13, capable of converting the circularly polarised beam of light from the reflector apparatus 3 into a second linearly polarised beam of light—in which the second linearly polarised beam of light has a different polarisation to the first linearly polarised beam of light. As shown in FIGS. 1a and 1b, filter 13 polarises light in a second plane of linearly polarised light, being identified as (I). For the purposes of the example, the planes of linearly polarised light (–) and (I) are orthogonal, but such is not essential.

Those skilled in the art will understand that the effect of the reflector filter 11 is to remove the linear polarisation imparted by the emitter filter 9. Accordingly, the filter 11 could be any filter which modifies the beam into a circularly polarised, elliptically polarised or even an unpolarised beam of light. In a further alternative, reflective filter 11 could be any filter which modifies the beam into light having a distribution of different polarisations.

Alternatively, although the detector apparatus 1 described above relates to a detector system having the emitter apparatus 2 and receiver apparatus 4 on the same surface and in close proximity, those skilled in the art will know that a reflective-type smoke detector may have the receiver located remotely from both the emitter and reflector. In the former, where the emitter and receiver are located close together and/or are in the same housing, the volume to be monitored is traversed twice by the beam of light when traversing from the emitter to the reflector and from the reflector to the receiver. However, in the latter when the receiver is not located proximally, the emitted beam to the reflector may traverse a first volume to be monitored and the reflected beam to the receiver may traverse a second volume to be monitored.

In use, and during smoke detection, the emitter 2 produces a beam of unpolarised light 21 which passes through the emitter filter 9, where it is polarised into a first linearly polarised beam of light 22, which then traverses the volume 6 to be monitored. The reflector filter 11 receives the first linearly polarised beam of light 22 and polarises it into a circularly polarised beam of light 23. Those skilled in the art will understand that the effect of this is to remove the linear polarisation and replace it with circular polarisation. The circularly polarised beam of light 23 is then reflected by the reflector 10 back towards the receiver 12, but first passes again through the reflector filter 11. The circularly polarised beam of light 23, having again traversed the volume 6 to be monitored, passes through the receiver filter 13, where it is polarised into a second linearly polarised beam of light 24, and optionally filtered, and is then subsequently received by the receiver 12. Analysis of the level of signal emitted as compared to the level of signal received is conducted, upon which a determination is made. If smoke is present in the volume 6 to be monitored, owing to obscuration, the level of signal received by the receiver would be lower than expected. If this falls below a predetermined threshold (an obscuration threshold) in no less than a predetermined time-period, an alarm is raised and/or remedial fire prevention proceeds.

Figure 2A:
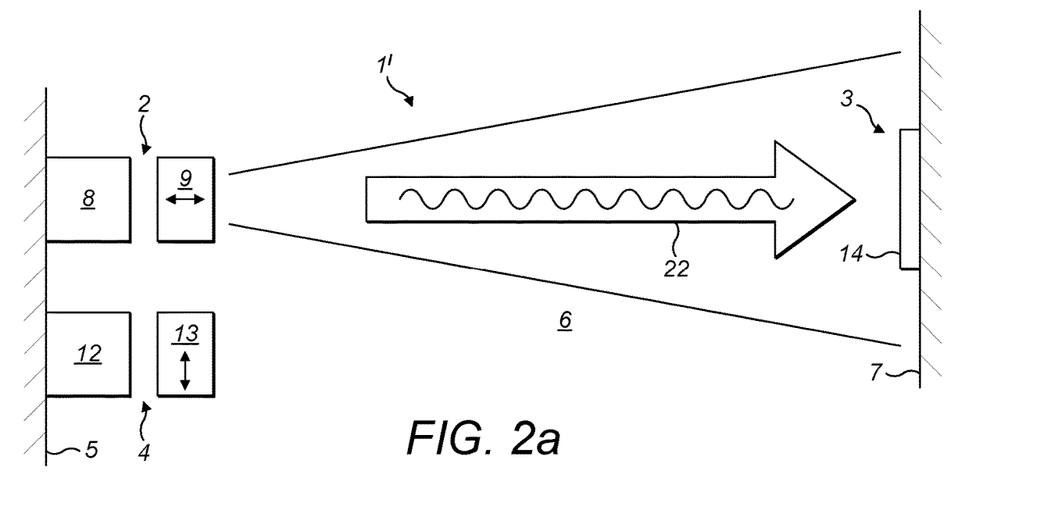
FIGS. 2a and 2b are schematic views of a second embodiment of optical beam smoke detector apparatus.
Figure 2B:
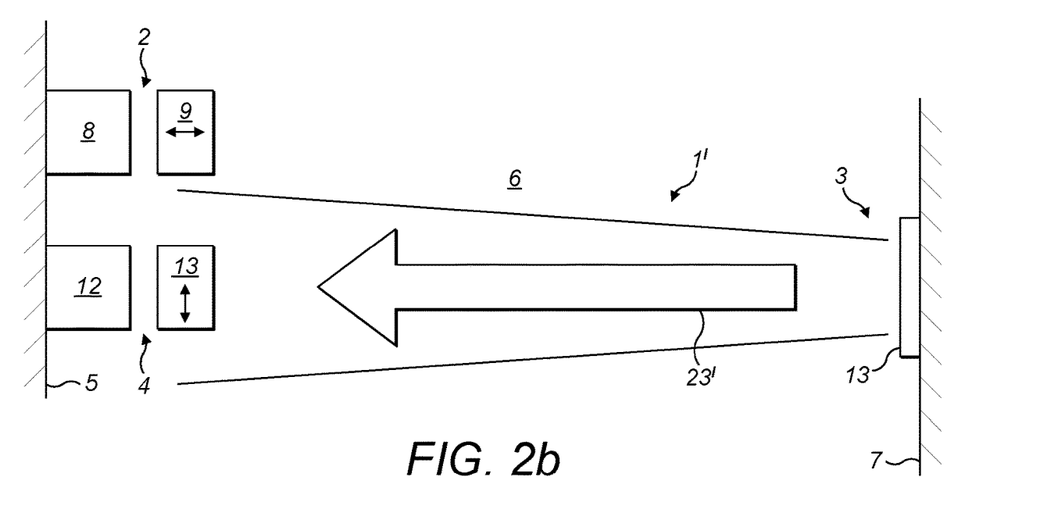

In a second embodiment, FIGS. 2a and 2b show an optical beam smoke detector apparatus, generally identified by reference 1'. The detector apparatus 1' is based upon the detector apparatus 1 described above in relation to FIGS. 1a and 1b, and includes many common features for which common references have been utilised. Only the differences will be described, and those relate to the reflector apparatus 3 of this second embodiment—as it does not include a separate reflector 10 and reflector filter 11—and instead utilises a corner-cube retroreflector 14. The corner-cube retroreflector 14 provides both reflectance and polarisation as it is capable of receiving the first linearly polarised beam of light and, during reflection, elliptical polarisation of the beam of light occurs.

In use, therefore, following traversing the volume 6 to be monitored, the first linearly polarised beam of light is received by the corner-cube retroreflector 14, from which the beam of light is both polarised into an elliptically polarised beam of light 23' and reflected parallel back across the volume 6 to be monitored to the receiver apparatus, where analysis of the signal is conducted in a very similar way to first embodiment.

The present invention may also take the form of a retro-fit kit for an optical beam smoke detector apparatus. The kit is intended to provide retro-fit items which, when added into, onto or otherwise included in an existing optical beam smoke detector apparatus, upgrade it so as to provide a detector apparatus shown in FIGS. 1a and 1b, or FIGS. 2a and 2b—the effect of the upgrade being to make the existing detector apparatus easier to commission and/or less susceptible to light reflected or received from sources other than the reflector.

The kit is a sleeve, cap or cover (not shown) including releasable securing means for temporarily securing the sleeve, cap or cover over a front of a housing of the emitter/receiver of the smoke detector apparatus, such that the first retro-fit, linear polarising filter is located in front of the emitter and the second retro-fit, linear polarising filter is located in front of the receiver.

In an alternative, the kit is a sleeve, cap or cover (not shown) including non-releasable securing means for permanently securing the sleeve, cap or cover over a front of a housing of the emitter/receiver of the smoke detector apparatus.

During commissioning, alignment of the projected beam and the reflector, in particular the pan and/or tilt of the emitter, reflector and/or receiver, of the detector apparatus 1, detector apparatus 1', or detector apparatus upon which is mounted the retro-fit kit is adjusted if the intensity of the second linearly polarised beam of light is below a commissioning threshold. Adjustment is preferably made automatically, but could be done manually, and the emitter, receiver and/or the reflector may be suitably housed within a moveable housing so as to conduct such adjustment.

In a third embodiment (not shown), the reflector apparatus is modified from that shown in FIGS. 1a and 1b, and FIGS. 2a and 2b. The reflector apparatus includes a receive portion and a transmit portion. The receive portion includes a mirror at 45 degrees to an incoming (I) polarised beam, and is capable of reflecting the (I) polarised light through a circular polariser (O) towards the transmit portion. The transmit portion includes a further mirror orthogonal to the first, such that outgoing light is transmitted back parallelly to incoming light, and further includes a linear polariser (−).

In use, incoming (I) polarised light is rotated so that outgoing light is (−) polarised. Accordingly, transmitted light is polarised orthogonally to the received light, which provides a change in the polarisation of emitted light which is detected by the receiver apparatus.

Although the embodiments have been disclosed as relating to optical beam smoke detection, those skilled in the art will understand that optical beam detectors generally can detect more than just smoke, and the principle of obscuration detection is common to all such optical beam detectors.

The invention claimed is:

1. A reflective-type optical beam smoke detector apparatus for smoke obscuration detection, comprising:
    a beam emitter apparatus;
    a reflector apparatus comprising a spherical retroreflector, an elliptical retroreflector, or a corner-cube retroreflector, that is locatable across a volume to be monitored; and
    a beam receiver apparatus,
    wherein the smoke detector apparatus is configured to adjust alignment of a projected beam with the reflector apparatus if an intensity is below a threshold, wherein:
    the beam emitter apparatus is configured to create a first linearly polarised beam of light of
    first linear polarisation and direct said first linearly polarised beam of light towards the reflector apparatus;
    the reflector apparatus is configured to either:
    i) receive the first linearly polarised beam of light and modify such light into a beam having circular polarisation or elliptical polarisation, and reflect said circularly polarised or elliptically polarised beam of light towards the beam receiver apparatus and across said volume to be monitored;
    OR
    ii) receive the first linearly polarised beam of light and reflect such light towards the beam receiver, and modify such light into a beam having circular polarisation or elliptical polarisation before transversing said volume to be monitored; and
    the beam receiver apparatus is configured to receive said circularly polarised or elliptically polarised light and create therefrom a second linearly polarised beam of light, in which the first and second linearly polarised beams of light have different polarisation.

2. The apparatus as claimed in claim 1, wherein the beam emitter apparatus comprises:
    i) a linearly polarising emitter for creating the first linearly polarised beam of light;
    ii) an emitter and one or more polarising filters for creating the first linearly polarised beam of light;
    iii) an integrated emitter and one or more polarising filters for creating the first linearly polarised beam of light; or
    iv) an emitter and a retro-fit, linear polarising filter for creating the first linearly polarised beam of light.

3. The apparatus as claimed in claim 1, wherein the beam receiver apparatus comprises:
    i) a linearly polarising receiver;
    ii) a receiver and one or more polarising filters for creating or transmitting the second linearly polarised beam of light;
    iii) an integrated receiver and one or more polarising filters for creating or transmitting the second linearly polarised beam of light; or
    iv) a receiver and a retro-fit, linear polarising filter for creating or transmitting the second linearly polarised beam of light.

4. The apparatus as claimed in claim 1 wherein, in use, the smoke detector apparatus detects smoke if an intensity of the second linearly polarised beam of light at the beam receiver apparatus falls below a threshold in no less than a predetermined time period.

5. The apparatus as claimed in claim 1, wherein, in use, a state of polarisation of the beam of light directed towards the reflector apparatus is the same as the state of polarisation of the beam of light received at the reflector apparatus, and/or a state of polarisation of the modified beam of light at the reflector apparatus is the same as the state of polarisation of the beam of light received at the receiver apparatus.

6. The apparatus as claimed in claim 1, wherein the first and second linearly polarised beams of light have orthogonal polarisation.

7. The apparatus as claimed in claim 1, wherein:
    the beam emitter apparatus comprises an emitter and one or more polarising filters for creating the first linearly polarised beam of light; and
    the beam receiver apparatus comprises a receiver and one or more polarising filters for creating or transmitting the second linearly polarised beam of light.

8. A method of installing a retro-fit kit for a reflective-type optical beam smoke detector apparatus, the smoke detector apparatus being as claimed in claim 1 and the kit comprising:
- a first retro-fit, linear polarising filter for a beam emitter, configured to create from an emitted beam the first linearly polarised beam of light of first linear polarisation; a second retro-fit, linear polarising filter for a beam receiver, configured to create from a received beam the second linearly polarised beam of light of second linear polarisation;
- the first and second retro-fit, linear polarising filters have different polarisation,
- wherein the method comprising:
  - (a) securing a first retro-fit, linear polarising filter to a beam emitter of the beam smoke detector apparatus;
  - (b) securing a second retro-fit, linear polarising filter to a beam receiver of the beam smoke detector apparatus;
  - (c) projecting the first linearly polarised beam of light of first linear polarisation across a volume to be monitored;
  - (d) receiving the first linearly polarised beam of light at a spherical retroreflector, an elliptical retroreflector, or a corner-cube retroreflector across said volume to be monitored and either:
    - i) modifying the first linearly polarised beam of light into a circularly polarised or elliptically polarised beam of light and then reflecting the circularly polarised or elliptically polarised beam of light across the volume to be monitored or a further volume to be monitored;
    OR
    - ii) reflecting and then modifying the first linearly polarised beam of light into a circularly polarised or elliptically polarised beam of light before the beam of light traverses the volume to be monitored or the further volume to be monitored; and
  - (e) receiving the circularly polarised or elliptically polarised beam of light across the volume to be monitored or the further volume to be monitored, and modifying the received circularly polarised or elliptically polarised beam of light into the second linearly polarised beam of light, in which the first and second linearly polarised beams of light have different polarisation; and, either:
    - iii) detecting and comparing with a commissioning threshold the intensity of the second linearly polarised beam of light, and adjusting alignment of the projected beam with the reflector apparatus if the intensity is below the commissioning threshold; or
    - iv) detecting obscuration if the intensity of the second linearly polarised beam of light is below an obscuration threshold.

9. The method of claim 8 comprising adjusting pan and/or tilt of an emitter, a reflector and/or a receiver of the reflective-type optical beam smoke detector apparatus.

10. The apparatus of claim 1 wherein the beam emitter apparatus, the reflector apparatus and/or the beam receiver apparatus comprise(s) a moveable housing configured for adjusting alignment of the projected beam.

11. A method for detecting smoke obscuration of an optical beam in a reflective-type optical beam smoke detector that is configured to adjust alignment of a projected beam with a reflector apparatus if an intensity is below a threshold, the method comprising:
- (a) projecting a first linearly polarised beam of light of first linear polarisation across a volume to be monitored;
- (b) receiving the first linearly polarised beam of light at a spherical retroreflector, an elliptical retroreflector, or a corner-cube retroreflector across said volume to be monitored and either:
  - i) modifying the first linearly polarised beam of light into a circularly polarised or elliptically polarised beam of light and then reflecting the circularly polarised or elliptically polarised beam of light across the volume to be monitored or a further volume to be monitored;
  OR
  - ii) reflecting and then modifying the first linearly polarised beam of light into a circularly polarised or elliptically polarised beam of light before the beam of light traverses the volume to be monitored or the further volume to be monitored;
- (c) receiving the circularly polarised or elliptically polarised beam of light across the volume to be monitored or the further volume to be monitored, and modifying the received circularly polarised or elliptically polarised beam of light into a second linearly polarised beam of light, wherein the first and second linearly polarised beams of light have different polarisation; and
- (d) detecting smoke obscuration if an intensity of the second linearly polarised beam of light is below a threshold.

12. The method as claimed in claim 11, wherein, projecting additionally comprises: creating a beam of unpolarised light and modifying the beam of unpolarised light into the first linearly polarised beam of light; or
using a linearly polarising emitter to create the first linearly polarised beam of light.

13. The method as claimed in claim 12, wherein, modifying the unpolarised beam of light comprises passing the beam of light through a first linear polarising filter, of first polarisation.

14. The method as claimed in claim 11, wherein, modifying the received circularly polarised or elliptically polarised beam of light comprises:
passing the beam through a second linear polarising filter, of different polarisation to the first polarisation; or
detecting the circularly polarised, elliptically polarised or unpolarised beam of light using a linearly polarising receiver.

15. The method as claimed in claim 11, wherein a state of polarisation of the beam of light projected across the volume to be monitored is the same as the state of polarisation of the beam of light received across the volume to be monitored, and/or a state of polarisation of the modified beam of light is the same as the state of polarisation of the beam of light received across the volume to be monitored or the further volume to be monitored.

16. The method of claim 11 comprising adjusting pan and/or tilt of an emitter, a reflector and/or a receiver of the reflective-type optical beam smoke detector.

17. A method for commissioning a reflective-type optical beam smoke detector apparatus that is configured to adjust alignment of a projected beam with a reflector apparatus if an intensity is below a threshold, the method comprising:
- (a) projecting a first linearly polarised beam of light of first linear polarisation across a volume to be monitored;

(b) receiving the first linearly polarised beam of light at a spherical retroreflector, an elliptical retroreflector, or a corner-cube retroreflector across said volume to be monitored and either:
   i) modifying the first linearly polarised beam of light into a circularly polarised or elliptically polarised beam of light and then reflecting the circularly polarised or elliptically polarised beam of light across the volume to be monitored or a further volume to be monitored;
   OR
   ii) reflecting and then modifying the first linearly polarised beam of light into a circularly polarised or elliptically polarised beam of light before the beam of light traverses the volume to be monitored or the further volume to be monitored;
(c) receiving the circularly polarised or elliptically polarised beam of light across the volume to be monitored or the further volume to be monitored, and modifying the received circularly polarised or elliptically polarised beam of light into a second linearly polarised beam of light, in which the first and second linearly polarised beams of light have different polarisation; and
(d) detecting and comparing with a commissioning threshold the intensity of the second linearly polarised beam of light, and adjusting alignment of the projected beam with a reflector apparatus if the intensity is below the commissioning threshold.

18. The method as claimed in claim 17, wherein a state of polarisation of the beam of light projected across the volume to be monitored is the same as the state of polarisation of the beam of light received across the volume to be monitored, and/or a state of polarisation of the modified beam of light is the same as the state of polarisation of the beam of light received across the volume to be monitored or further volume to be monitored.

19. The method of claim 17 comprising adjusting pan and/or tilt of an emitter, a reflector and/or a receiver of the reflective-type optical beam smoke detector apparatus.

* * * * *